US005967426A

United States Patent [19]

McLeod

[11] Patent Number: 5,967,426

[45] Date of Patent: Oct. 19, 1999

[54] KNOCKDOWN PORTABLE LIQUID DRYWALL MATERIAL SPRAY SYSTEM APPARATUS AND METHOD

[76] Inventor: David J. McLeod, 3834 175th Ave. NE., Redmond, Wash. 98052

[21] Appl. No.: 09/032,255

[22] Filed: Feb. 27, 1998

Related U.S. Application Data

[60] Provisional application No. 60/039,213, Feb. 28, 1997.

[51] Int. Cl.[6] .............................. A01C 23/00; B05B 9/00

[52] U.S. Cl. .......................... 239/662; 239/146; 239/147; 239/379; 239/668; 417/234; 418/48

[58] Field of Search .................................... 239/146, 147, 239/722, 302, 379, 662, 668; 417/234, 410.3; 418/48

[56] References Cited

U.S. PATENT DOCUMENTS

| | | | |
|---|---|---|---|
| 2,815,767 | 12/1957 | Kurns . | |
| 2,820,672 | 1/1958 | Arce et al. | 239/379 X |
| 3,079,050 | 2/1963 | Wahl . | |
| 3,716,066 | 2/1973 | Currier et al. | 239/379 |
| 3,889,850 | 6/1975 | Whitt . | |
| 3,892,360 | 7/1975 | Schlottmann et al. | 239/379 X |
| 4,278,279 | 7/1981 | Zimmerman | 285/255 |
| 4,669,961 | 6/1987 | Lorett | 417/410.3 X |
| 4,848,659 | 7/1989 | Tadych | 239/722 X |
| 5,067,856 | 11/1991 | Sisk | 406/41 |
| 5,314,100 | 5/1994 | Deaver . | |
| 5,639,227 | 6/1997 | Mills | 417/410.3 X |
| 5,722,820 | 3/1998 | Wild et al. | 418/48 |
| 5,769,618 | 6/1998 | Ono et al. | 418/48 |

OTHER PUBLICATIONS

Product Brochure by Xlent Equipment Co. for "Ultra Air Sprayall".

Product brochure by Quikspray, Inc. for "Carrousel Pump".

Product brochure by ChemGrout for "Mini Grouters CG–050 and CG–550P".

Product brochure by Stray Force MFG. Inc. for Drywall & Plastering Machines.

Product Brochure bySpray King Mfg., Inc. for "Spray Machines".

*Primary Examiner*—Andres Kashnikow

*Assistant Examiner*—Robin O. Evans

*Attorney, Agent, or Firm*—William G. Forster

[57] ABSTRACT

The invention is a compact, self-contained, portable, electrically powered, knockdown spray application machine/system for spraying liquid material on to surfaces. The spray system comprises a frame with wheels for supporting and transporting the components thereof. The spray system is powered by an electrically activated motor which includes a motor drive shaft disposed about a motor drive shaft axis. Attached to the motor is a gear reducer having a driven end and a drive end wherein the driven end is configured to receive and engage the motor drive shaft. The drive end includes a gear reducer drive shaft that rotates responsive to electrical activation of the motor. Coupled directly to the drive end of the gear reducer is a pump comprising a pump housing. The pump housing is shaped to define a containment chamber for receiving and containing liquid material therein. The pump housing also defines an inlet port for receiving and directing liquid material into the containment chamber. Mounted to the pump housing is a stator, the stator being mounted to the pump housing such that it is in communication with the containment chamber. Within the stator is a rotor disposed for rotation about a pump rotation axis responsive to rotation of the gear reducer drive shaft.

16 Claims, 8 Drawing Sheets

FIG. 6
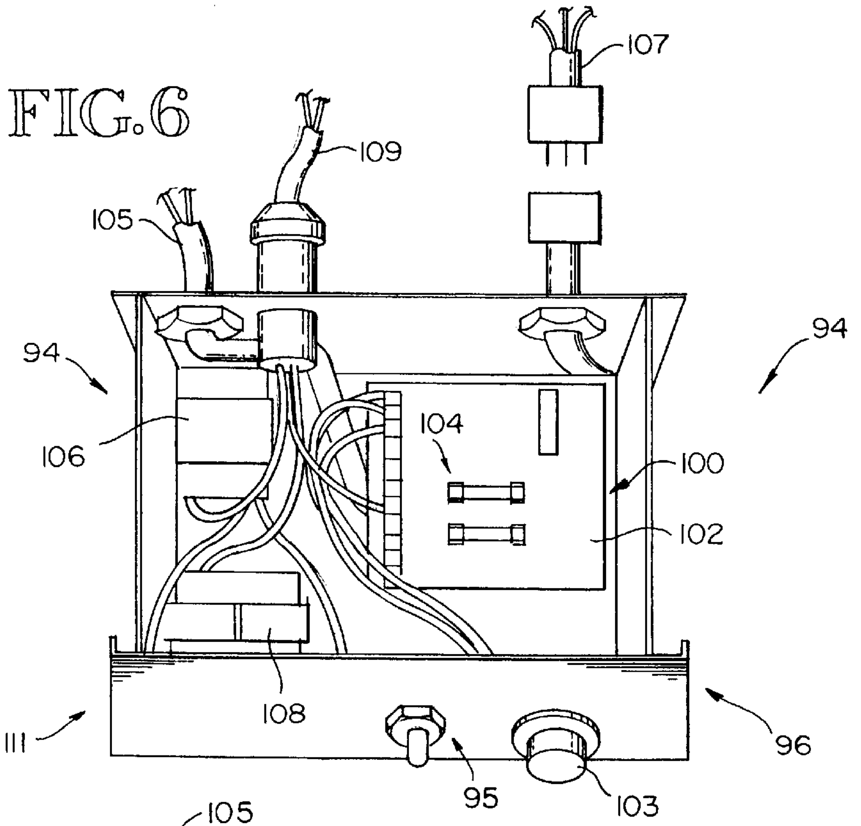
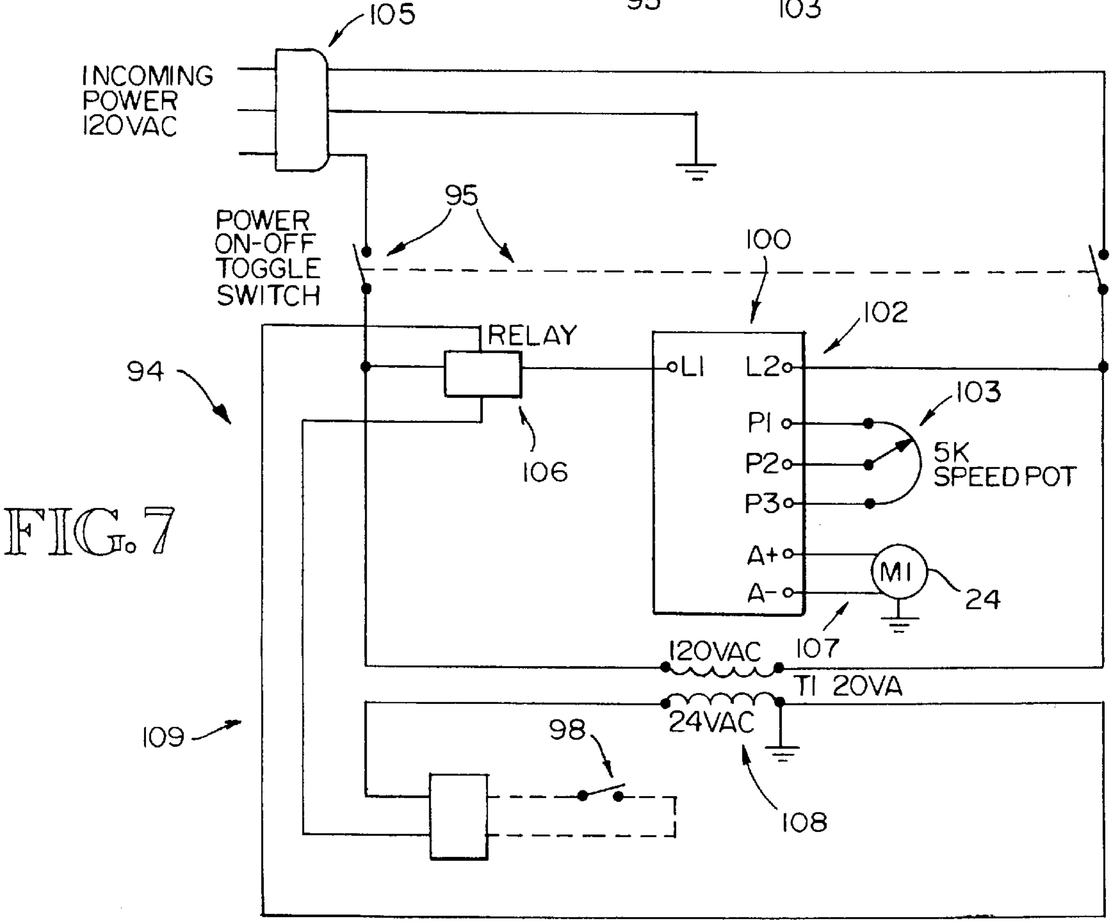
FIG. 7

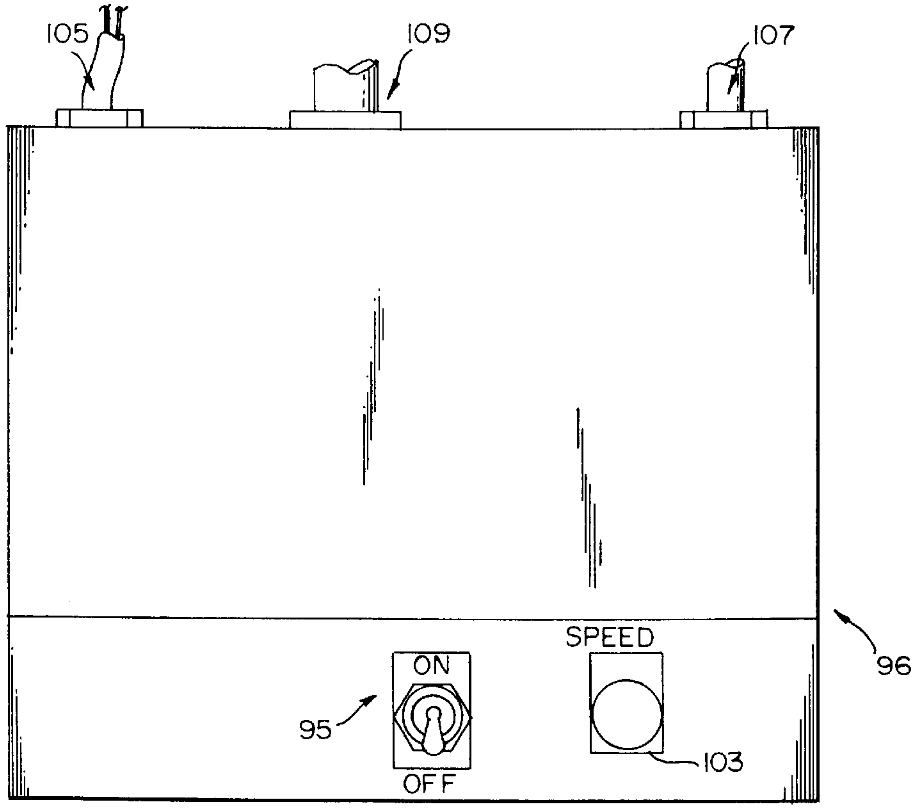
FIG. 8
FIG. 9
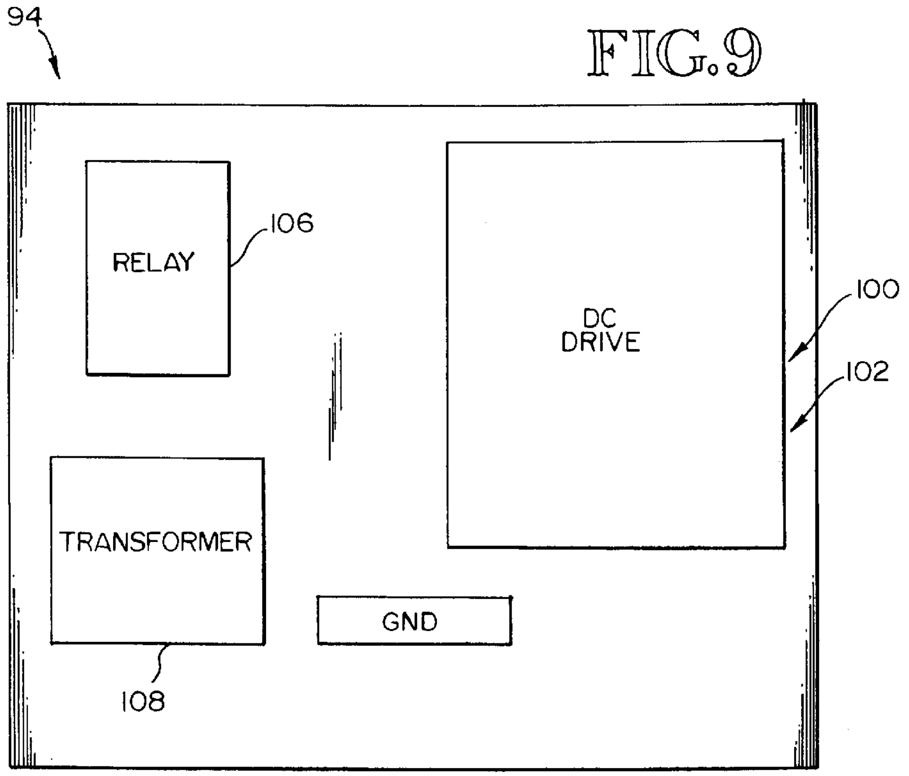

KNOCKDOWN PORTABLE LIQUID DRYWALL MATERIAL SPRAY SYSTEM APPARATUS AND METHOD

This application claims the benefit of U.S. Provisional Application No. 60/039,213 filed Feb. 28, 1997.

BACKGROUND

This invention relates generally to spray equipment for applying texture and acoustic materials to surfaces, and more particularly to an electrically operated spray system that is arranged to maximize compactness and enable quick disassembly for ease of cleaning, repair, and transportation.

Transportable pumping systems for pumping liquids at construction job locations are well known and have been employed for such purposes for many years. Because of size and bulkiness of such systems, they are commonly mounted on vehicles or trailers for ease of transportation. One early example of a vehicle mounted pumping system is illustrated in U.S. Pat. No. 2,815,767 issued to Kurns in 1957. The Kerns device is a hydraulic pumping system for selectively discharging liquids from any one of a plurality of vehicle mounted tanks. Because the Kerns pumping device is hydraulically activated, and because it employs large tanks for liquid storage, it would be impractical for use on multiple small jobs where ease of transportation, short set-up time, and quick cleaning are needed.

A subsequent design is illustrated in U.S. Pat. No 3,889,850 issued to Whitt in 1975. The Whitt invention is directed to a texture and acoustic application device utilizing equipment comprising a prime mover for driving a hydraulic pump and also for driving an air compressor. Like the Kerns invention, Whitt employes large vehicle mounted components such tanks and hydraulically activated equipment that are best suited for large jobs.

Following Whitt, U.S. Pat. No. 5,314,100 issued to Deaver in 1994 illustrating a grout delivery system that comprises a grout storage hopper connected to a motor-operated pump to pump flowable grout through a flexible hose for application to a work surface. The Whitt device, like many such prior inventions, is permanently mounted to a large transport means and is directed to jobs of substantial size requiring large amounts of liquid, viscous materials.

Accordingly, a need remains for texture spray equipment for use in small and medium size jobs where equipment design promotes quick set-up, easy disassembly, and is compact, very portable and employs interchangeable parts for quick, inexpensive repair.

SUMMARY

One object of the present invention is to reduce the size of equipment employed in the application of texture and acoustic materials to surfaces;

A second object is to reduce the time required to clean equipment employed in the application of texture materials and the like, to surfaces;

Another object is to increase the portability of texture spray equipment;

Yet another object is to enable an operator to easily interchange parts between spray equipment;

A further object is to reduce the expense of purchasing and operating texture spray systems;

Still another object is to enable an operator of a spray system to easily transport the same to remote locations.

The invention is a compact, self-contained, portable, electrically powered, knockdown spray application machine/system for spraying liquid material on to surfaces.

The spray system comprises a frame with wheels for supporting and transporting the components thereof. The spray system is powered by an electrically activated motor which includes a motor drive shaft disposed about a motor drive shaft axis. Attached to the motor is a gear reducer having a driven end and a drive end wherein the driven end is configured to receive and engage the motor drive shaft. The drive end includes a gear reducer drive shaft that rotates responsive to electrical activation of the motor.

Coupled to the drive end of the gear reducer is a pump comprising a pump housing. The pump housing is shaped to define a containment chamber for receiving and containing liquid material therein. The pump housing also defines an inlet port for receiving and directing liquid material into the containment chamber. Mounted to the pump housing is a stator, the stator being mounted to the pump housing such that it is in communication with the containment chamber. Within the stator is a rotor disposed for rotation about a pump rotation axis responsive to rotation of the gear reducer drive shaft. Such rotation of the stator propels the liquid material through a hose to the desired surface for placement of liquid material thereon.

In accordance with another aspect of the invention the pump rotation axis is disposed transverse to the motor drive shaft axis.

In accordance with another aspect of the invention the same is directed to a method of making a spray system and using the system to apply materials to surfaces.

The foregoing and other objects, features, and advantages of this invention will become more readily apparent from the following detailed description of a preferred embodiment which proceeds with reference to the accompanying drawings.

BRIEF DESCRIPTION OF THE DRAWINGS

FIG. 6 is a front perspective view of a control box illustrating the layout therein of its primary components including a relay, transformer and circuit board.

FIG. 7 is a electrical schematic diagram of a typical control unit for controlling the motor speed and on/off function.

FIG. 8 is a plan view of the exterior of a control box illustrating the motor controls and location of electric cables leading into and out of the control box.

FIG. 9 is a plan view of the interior of a control box illustrating the layout therein of its primary components including a relay, transformer and circuit board.

DETAILED DESCRIPTION OF PREFERRED EMBODIMENT

FIGS. 1 through 10 show a knockdown portable liquid drywall spray system 20 in accordance with the present invention. The invention is a compact, portable, electrically powered liquid drywall material spray application machine/device that can be quickly disassembled for ease of transportation or repair. The drywall spray system 20, hereinafter referred to as the "spray system 20", is provided as a conveyance mechanism for delivering, under pressure, liquid drywall/texture material (not shown) for application as an outer coating on the walls of homes, offices and the like. As will be more fully discussed below, the liquid material is conveyed through a hose 21 to a location remote from the spray system 20. In addition, the spray system 20 can be employed to convey and deliver other types of viscous liquid.

Figure 1:
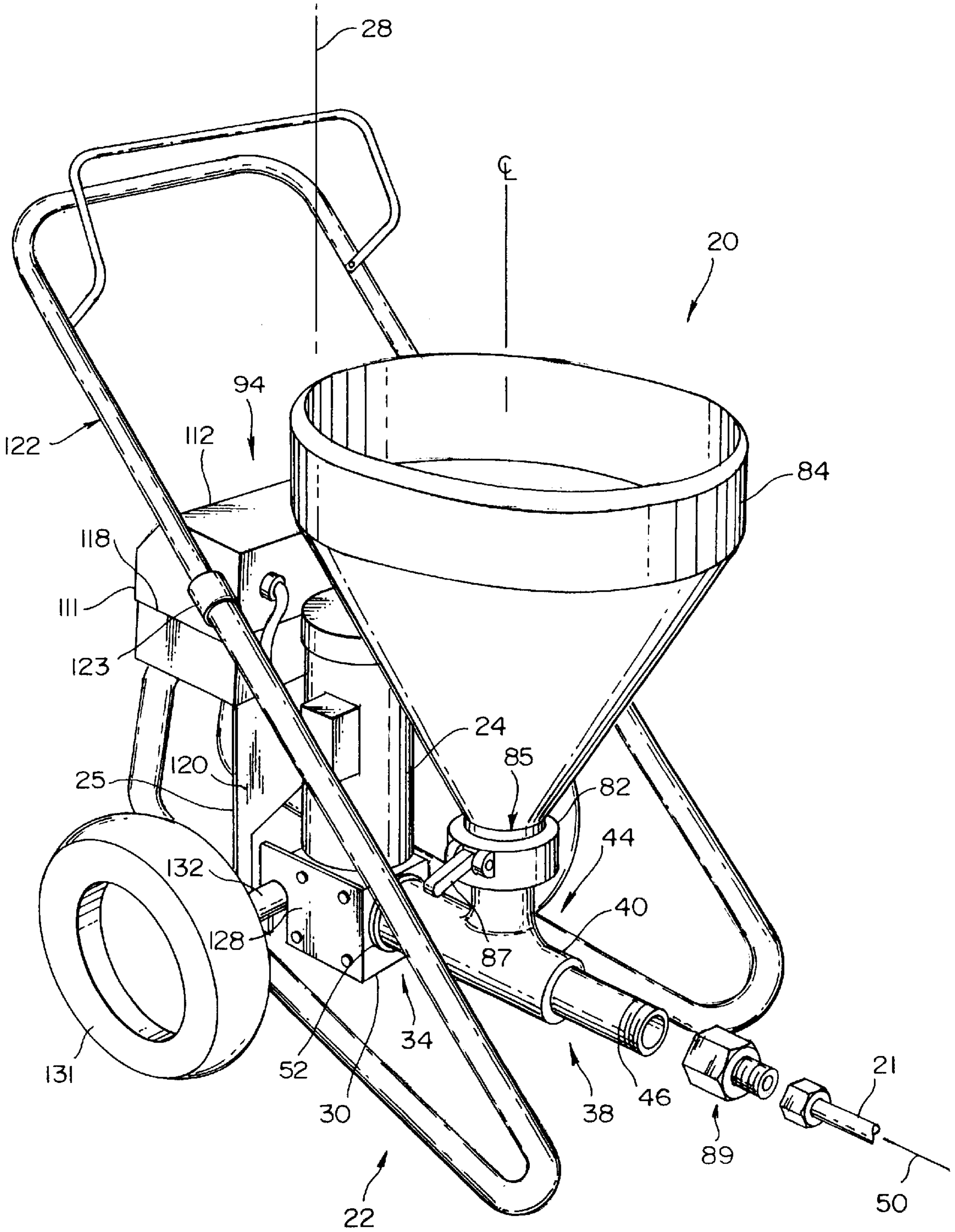
FIG. 1 is a perspective view of the primary components of the spray system in accordance with the present invention.
Figure 2:
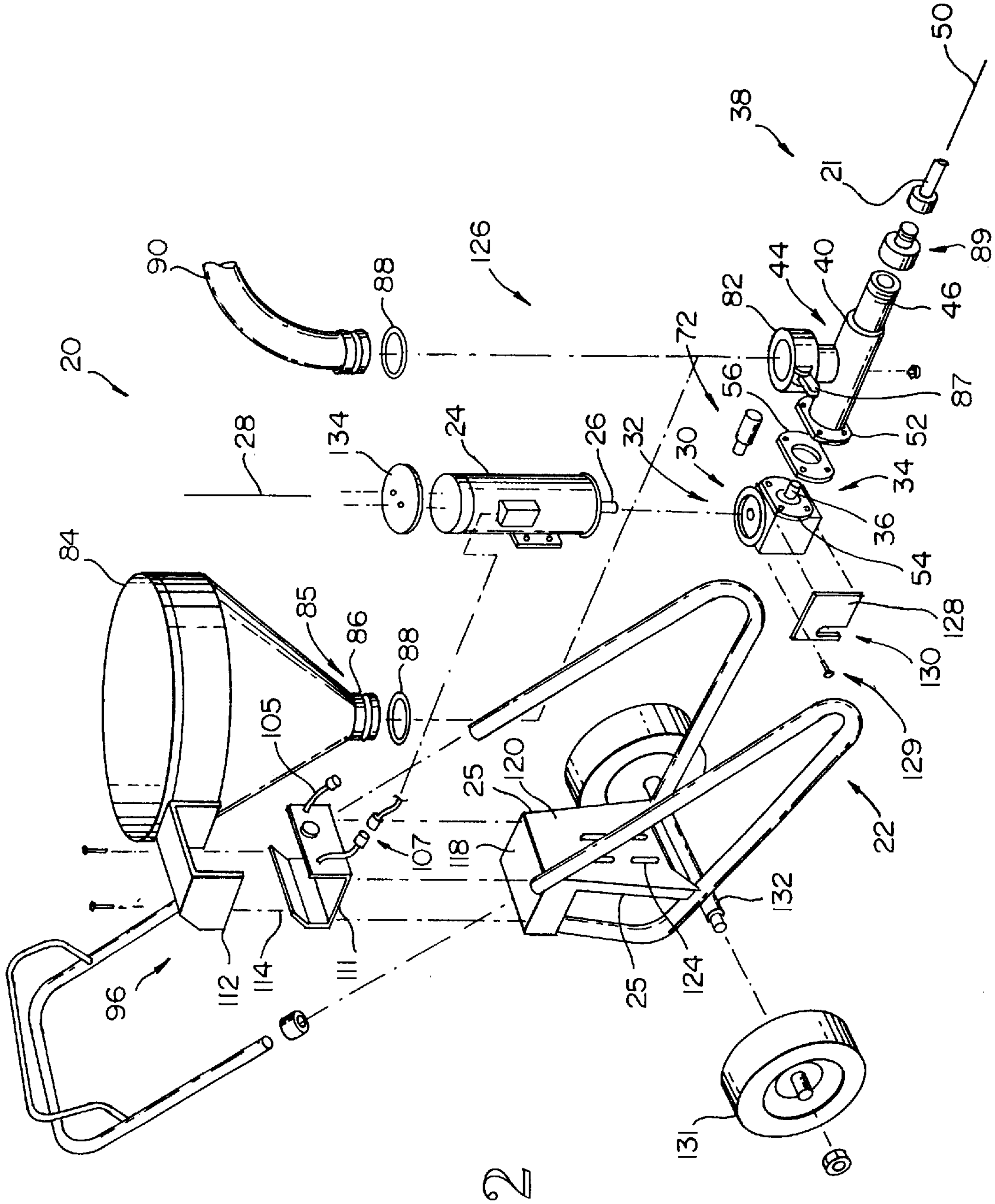
FIG. 2 is an exploded perspective view showing the primary components of the spray system.

Broadly stated, the spray system 20 comprises a frame 22 which provides support, either directly or indirectly, for all the primary components of the spray system 20. The general arrangement of the components of the spray system 20 are best illustrated in FIGS. 1 and 2. The spray system 20 includes an electrically activated DC motor 24 supported from a mounting bracket 25 that is attached to the frame 22. The motor 24 transmits power through a motor drive shaft 26 that rotates about a motor drive shaft axis 28.

Connected to the drive shaft 26 is a gear reducer 30. In the preferred embodiment, the gear reducer 30 is of the type referred to as a "right angle gear reducer" such as one manufactured by "Faulk". This type of gear reducer redirects, i.e., changes the drive train/path by "90" degrees. As will be more fully explained below, the incorporation of the "right angle" gear reducer 30 greatly enhances the compact feature of the spray system 20.

The gear reducer 30 comprises a driven end 32 and a drive end 34. The driven end 32 is configured to securably engage the motor 24 so that the motor 24 is fixed or mounted to the gear reducer 30. Further, the driven end 32 is adapted to receive the motor drive shaft 26, and engage the same so that the motor 24 can transmit rotational power through the internal gear mechanism (not illustrated) of the gear reducer 30, to a gear reducer drive shaft 36. The gear reducer drive shaft 36 extends outward from the drive end 34. Accordingly, the gear reducer drive shaft 36 rotates responsive to the electrical activation of the motor 24.

Specifically, in the preferred embodiment, the motor drive shaft 26 rotates and transmits power through the gear reducer 30 which, in turn, steps down the motor RPM by a factor of approximately 5 to 1. Thus for every 5 revolutions of the motor drive shaft 26, the gear reducer drive shaft 36 turns 1 revolution. Accordingly, a preferred embodiment motor that turns at a maximum of 1750 RPM will cause the gear reducer drive shaft 36 to rotate at 350 RPM.

The motor 24 and gear reducer 30 are provided to drive a pump 38 of the progressive cavity type which propels the liquid drywall material. The pump 38 comprises a pump housing 40 that is coupled directly to the drive end 34 of the gear reducer 30. As will be more fully discussed below, this "direct connection' design between the gear reducer 30 and the pump 38 simplifies the arrangement, connection and number of pump drive components. Moreover, this design eliminates the need for an exposed coupling connection between the gear reducer and the pump 38.

The pump housing 40 is shaped to define a containment chamber 42. The containment chamber 42 contains the liquid drywall material therein as it passes into and through the pump 38. For that purpose, the pump housing 40 includes an inlet port 44 that is in communication with the containment chamber 42. The inlet port 44 is disposed to receive and direct liquid drywall material into the containment chamber 42.

With the drive end 34, of gear reducer 30, located at one end of the pump housing 40, the opposite end thereof is adapted to threadedly receive a stator 46. Specifically, the stator 46 is threadedly mounted to the pump housing 40 such that it is in communication with the containment chamber 42. Within the stator 46, a rotor 48 is rotatably received for rotation about a pump rotation axis 50. The rotor 48 rotates responsive to rotation of the gear reducer drive shaft 36. It should be noted that in the preferred embodiment, the pump rotation axis 50 is disposed transverse to the motor drive shaft axis 28, and is aligned with the gear reducer drive shaft 36.

Figure 3:
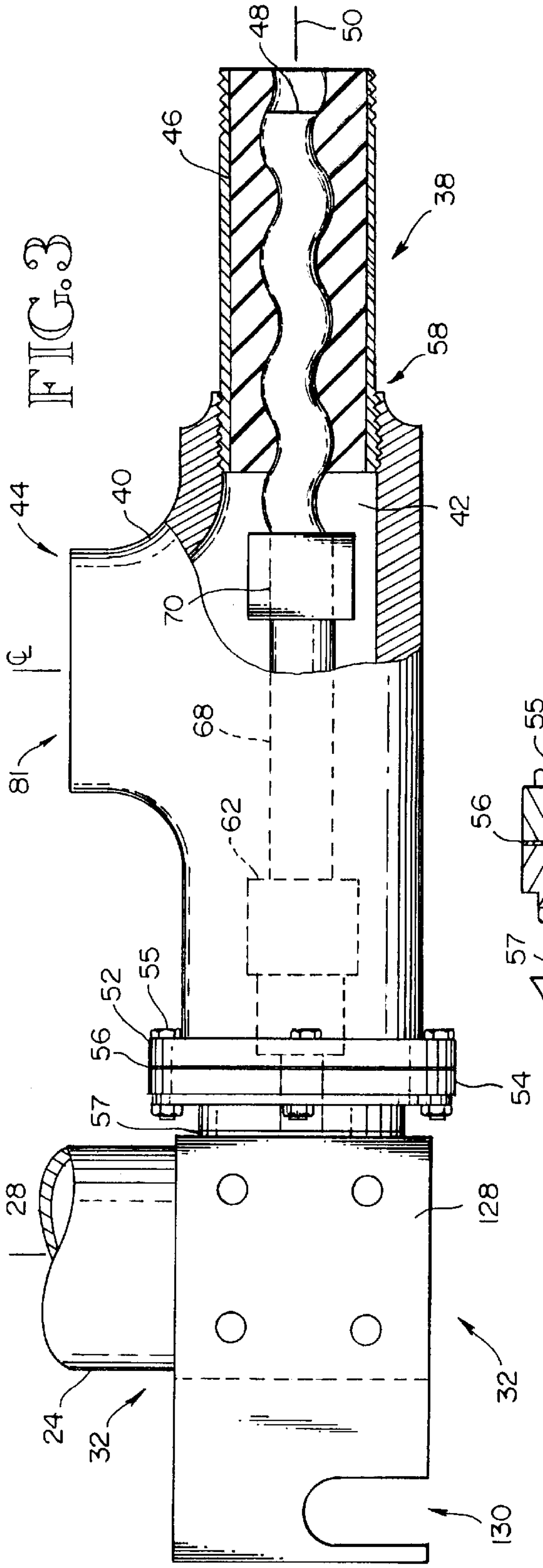
FIG. 3 is a fragmentary side elevation view of a pump housing with stator, wherein the pump housing is connected to a right angle gear reducer, and portions of the pump housing and stator are broken away to show the rotor seated within the stator.
Figure 4:
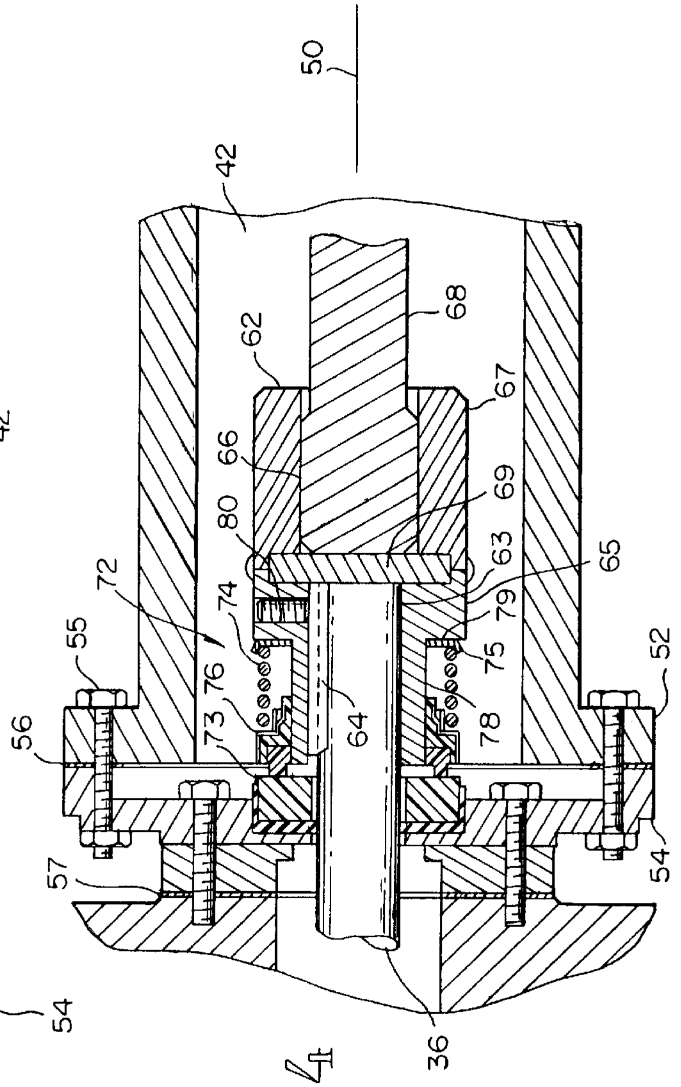
FIG. 4 is an enlarged fragmentary side cross section/side elevation view of the connection between the gear reducer and the pump housing, the view illustrating a mechanical seal disposed about the gear reducer drive shaft.

Considering now in more detail the components of a spray system 20, the preferred embodiment pump 38 is designed to cantilever from the gear reducer 30. Thus the gear reducer 30 supports the entire weight of the pump 38 and all components that are attached thereto. As best illustrated in FIGS. 2, 3 and 4, it can be seen that the pump housing 40 has the shape of an inverted "TEE" and is hollow to define the containment chamber 42. The preferred method of manufacturing the pump housing 40 is to cast it from stainless steel for strength and ease of maintenance. The pump housing 40 includes a housing flange 52 that is bolted with four bolts 55 to gear reducer flange 54. To seal this connection, flange gasket 56 is provided between the housing flange 52 and the gear reducer flange 54 and likewise a flange gasket 57 is provided between the gear reducer 30 and the gear reducer flange 54. The gear reducer flange 54 is attached to the gear reducer 30 by a plurality of alike bolts 59. The gear reducer drive shaft 36 is centrally disposed within the gear reducer flange 54, and extends into the pump housing 40.

Directing attention now to FIG. 3, at the opposite end of the pump housing 40, along the pump rotation axis 50 is a threaded bore 58. The threaded bore 58 is sized to threadedly receive a standard, "off the shelf" stator 46 of the type that is employed in typical drywall spray equipment. In this way, a standard compatible rotor 48 can be aligned within the stator 46 along the pump rotation axis 50.

In order to connect the rotor 48 to the gear reducer drive shaft 36, a plurality of components are linked together along the pump rotation axis 50, within the pump housing 40. Connected to the gear reducer drive shaft 36, is a square drive coupler 62. The square drive coupler 62 is constructed from three primary components including a shaft receiver 65, a rod receiver 67, and a barrier plate 69. The shaft receiver 65 is configured to receive the round gear reducer drive shaft 36. Accordingly, a centrally disposed radially inner bore 63 is provided. The radially inner bore 63 is of a diameter to permit a close fit over the gear reducer drive shaft 36. To prevent relative rotational movement between the square drive coupler 62 and the gear reducer drive shaft 36 a key 64 is disposed therebetween. Opposing the shaft receiver 65 is a rod receiver 67. The rod receiver 67 is configured to receive a connecting rod 68. For this purpose, the rod receiver 67 includes a drive socket 66 for receiving a connecting rod 68. In this way, the square drive coupler 62 can be connected to the rotor 48 by a connecting rod 68. One end of the connecting rod 68 fits into drive socket 64; the other end of the connecting rod 68 fits into a rotor socket 70 defined by the end portion of rotor 48 that lies within the containment chamber 42. It should be noted that the ends of connecting rod 68 are generally square in shape, with slightly rounded edges, so that the same can be received into similarly shaped square sockets of the rotor 48 and the square drive coupler 62, i.e., the drive socket 66 and the rotor socket 70. In addition, as best seen in FIG. 5, the opposing square ends of the connecting rod 68 are not aligned: they are twisted/rotated, relative to one another by 45 degrees.

Referring again to the components of the square drive coupler 62, the barrier plate 69 is disposed between the shaft receiver 65 and the rod receiver 67. Because the shaft receiver 65 and the rod receiver 67 are in contact, a slight recess is machined into each piece so that the same can be press fitted over the barrier plate 69. After the pieces are so fitted, the shaft receiver 65 and the rod receiver 67 are welded together around their abutting circumference.

It should be understood that when the pump 38 is in operation, the thrust forces generated by the rotating rotor 48 pushing material out the stator 46 tend to urge the rotor 48 back toward the gear reducer 30. Accordingly, the connecting rod 68 is prevented from becoming disconnected. This method of coupling the connecting rod 68 to the square drive coupler 62 and the rotor 48 allows easy disassembly for repair or replacement of parts.

Figure 5:
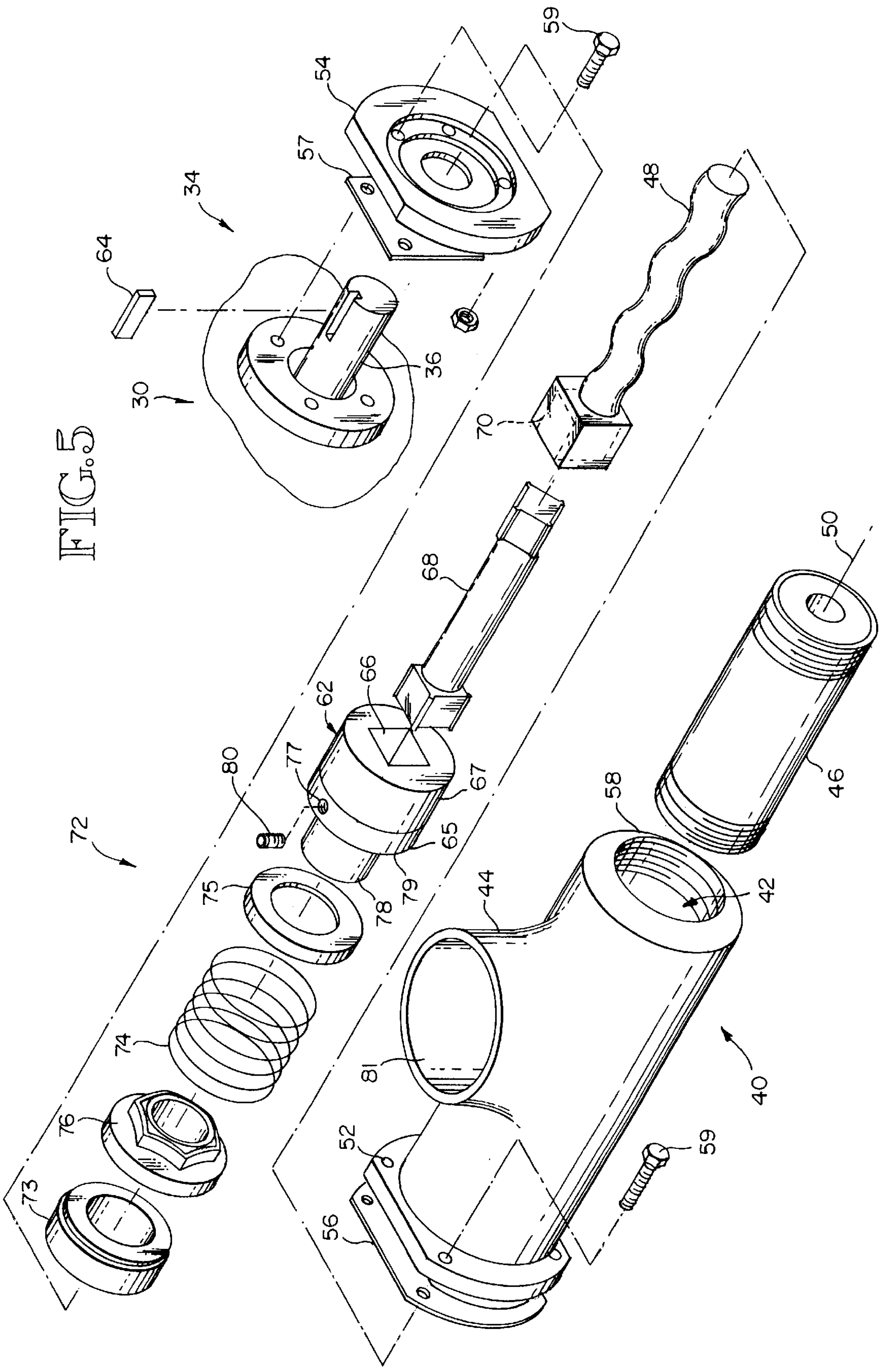
FIG. 5 is an exploded fragmentary perspective view illustrating the primary components of the pump.

Because the liquid drywall material can travel into any cavity that is not sealed, an additional mechanical seal 72 is provided around the gear reducer drive shaft 36 as illustrated in FIGS. 4 and 5. The mechanical seal 72 is a standard shaft-type seal manufactured by Pac-Seal, Inc. In the preferred embodiment, the mechanical seal 72 is combined with the square drive coupler 62 thereby reducing the need for special parts to hold the mechanical seal 72 in place along the gear reducer drive shaft 36. As a result, the square drive coupler 62 performs as part of the gear reducer drive shaft 36 as well as a retainer/holder for the mechanical seal 72.

The mechanical seal 72 comprises a seal seat 73 disposed around the gear reducer drive shaft 36, abutting the gear reducer flange 54. The seal seat 73 is urged against the gear reducer flange 54 by a spring 74 that is disposed between a spring retainer 75 and a drive band assembly 76. The spring retainer 75 fits over a reduced diameter portion 78 of the square drive coupler 62 and is urged against the shoulder 79 formed by the reduced diameter portion 78. The drive band assembly 76 is likewise urged against the seal seat 73. The drive band assembly 76 includes a centrally disposed rubberized bore that is sized to fit tightly around the gear reducer drive shaft 36 thus creating a seal therebetween. Although the thrust forces generated by the pump tend to keep the square drive coupler 62 engaged with the gear reducer drive shaft 36, a set screw 80 is employed through threaded bore 77 of the square drive coupler 62 against key 64. All components of the mechanical seal 72 rotate with the gear reducer drive shaft 36 except for the seal seat 73 which is stationary.

Turning again to FIGS. 2 and 3, a pump housing 40 having an inlet port 44 is illustrated. The inlet port 44 is the upward extending portion of the "TEE". The inlet port 44 defines an inlet bore 81 through which liquid drywall material is directed. The inlet port 44 is in communication with the containment chamber 42 so that liquid drywall material can be funneled therein. For this purpose, an industry standard female lever camloc 82 is provided and is welded to the inlet port 44 as illustrated in FIGS. 1 and 2.

The female lever camloc 82 permits the quick connection and disconnection of various sources of liquid drywall material. In the preferred embodiment, a hopper 84 is provided in the shape of a funnel. The hopper 84 is constructed in one piece from aluminum. Located at the narrow bottom portion of the hopper 84 is a outlet bore 85 around which a compatible industry standard male camloc 86 is mounted. With this arrangement, the hopper 84 can be directly supported from the pump housing 40 through the connection of the male and female camloc connection. Specifically, the male camloc 86 is inserted into the female lever camloc 82 wherein the lever 87 is then positioned to lock the two together. In order to complete the seal, a gasket 88 is disposed between the female lever camloc 82 and the male camloc 86.

Because a female lever camloc 82 is employed on the pump housing 40, a supply hose 90 having a male camloc 86 on the end thereof can be substituted for the hopper 84 as a supply means for liquid drywall material. This feature allows the user to connect any source of liquid drywall material to the pump 38 through the use of a supply hose 90. Thus, the preferred embodiment configuration does not limit the sources of liquid drywall material to hoppers.

In the preferred embodiment, the liquid drywall material is fed through the hopper 84 by gravity into the pump housing 40 where the rotating rotor 48 forces it out through the stator 46. For delivery of the drywall material to a remote location, a hose 21 is connected to the end of the stator 46 that extends away from the pump housing 40. To facilitate that connection, the stator 46 is threaded to receive a standard pipe fitting. The most common type of pipe fitting for this purpose is a reducer 89. In this way the hose 21 can be attached via readily obtainable common pipe fittings.

Figure 10:
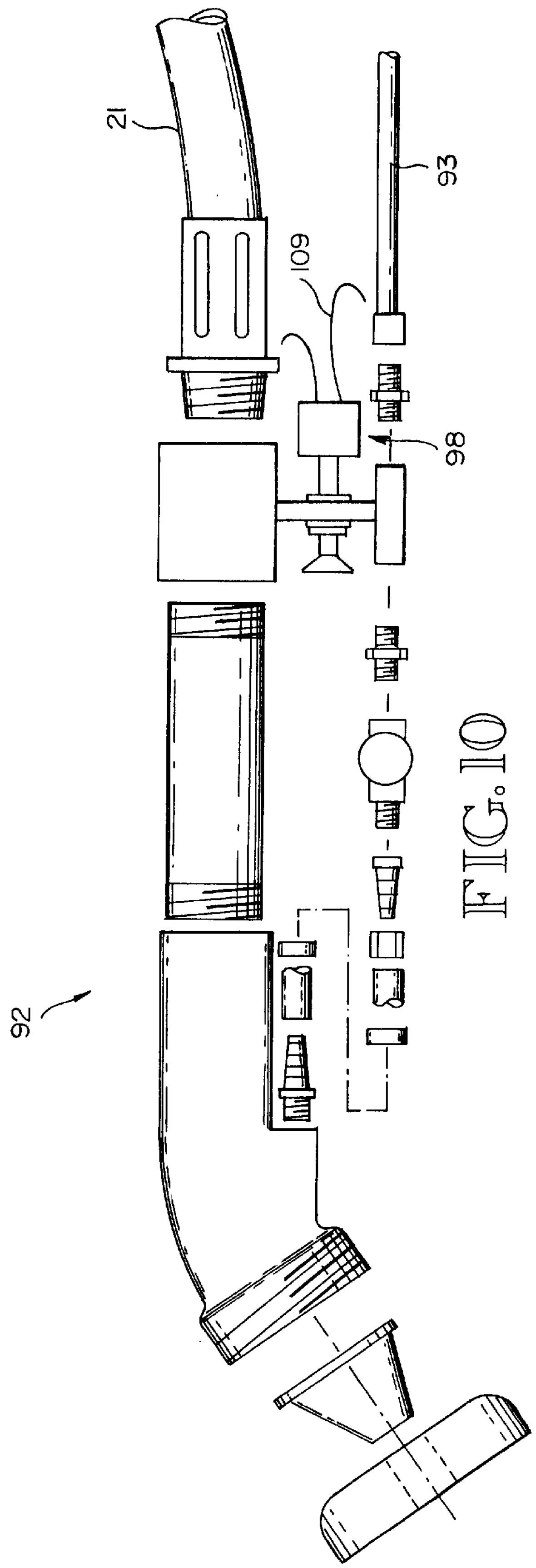
FIG. 10 is a side elevation view of a spray gun including an on/off electric control switch for remotely energizing the control box/electric motor.

As illustrated in FIG. 10, the remote end of the hose 21 is shown connected to a spray gun 92. The spray gun 92 is of conventional design, and is standard equipment for spray systems wherein a compressor (not illustrated) supplies compressed air to the spray gun 92 through an air hose 93.

Turning now to FIGS. 6 through 9 and 11, the electrical control system 94 is illustrated. Broadly stated the control system 94 is designed to allow a user to adjust the rotational speed of the DC motor 24 from zero RPM through the maximum RPM at a control box 96 that accommodates the primary components of the control system 94. Further, the control system 94 allows the user to start or stop the motor 24 by energizing the control system 94 at either the control box 96 (via an on-off switch 95), or from a remote location at the spray gun 92 by a similar push/pull remote control switch 98. The novel feature being that the remote control switch 98 operates from a 24 volt connection so that the user is not exposed to a high voltage situation when using the spray gun 92 under wet conditions.

A primary component of the control system 94 is a motor control board 100 for controlling the RPM of the motor 24 by electronically controlling the DC voltage output. In the preferred embodiment, a KB Electronics, Inc KBIC control board is used in combination with a KB Electronics KBIC-KBMM barrier terminal board 102. In the preferred embodiment, the control board 100 is disposed under the terminal board 102. The terminal board 102 is employed to facilitate easy electrical connections. The control board 100 in combination with the terminal board 102 includes terminals (L1 & L2) which are supplied from a 120 volt AC input line 105; output terminals (A+& A−) for a DC output line 107 to the motor 24; and additional terminals for the connection of a potentiometer 103 that provides the control input to the control board 100 for controlling the DC output voltage to the motor 24. As illustrated in FIG. 6 a pair of fuses 104 are provided to protect the motor 24 and to protect the control board 100 against electrical failure.

Figure 11:
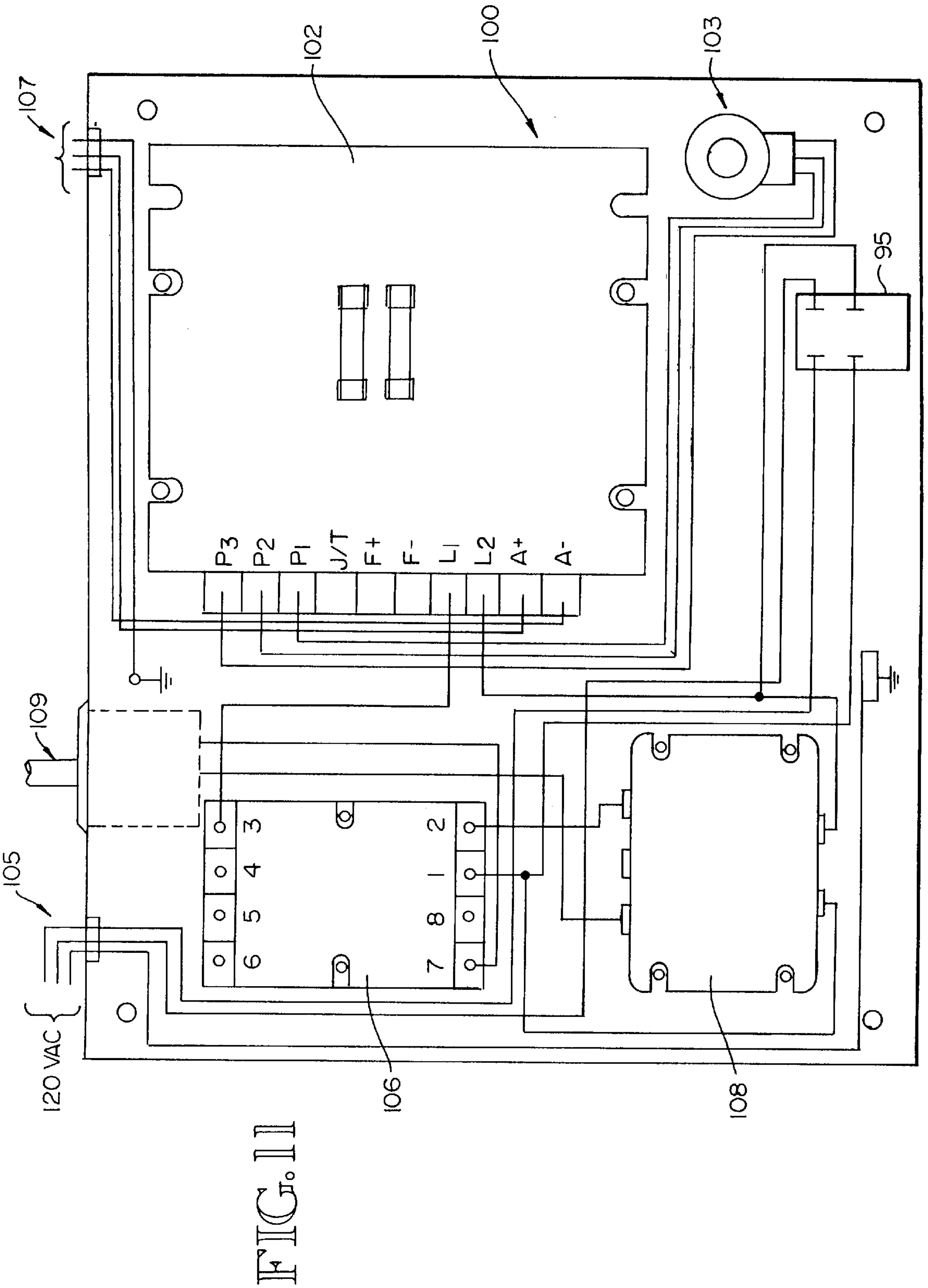
FIG. 11 is a electrical schematic diagram illustrating the electrical connections between the various electrical components.

To enable a user to remotely control the power (on/off) mode of the control board 100, a 24 volt circuit/line 109 extends to the remote control switch 98. The remote control switch 98 controls a 24 volt relay 106 that is powered from a transformer 108. In the preferred embodiment, the relay 106 is readily obtainable and is manufactured by "Potter & Brumfield: part KRPA-11AG-24". Likewise, the transformer 108 is readily obtainable and is manufactured by "EDWARDS: CATALOG No. 592". The transformer 108 steps a portion of the 120 VAC input line 105 down to 24 Volts. This arrangement physically and electrically is illustrated in FIGS. 6–9 along with a wiring diagram as illustrated in FIG. 11. Briefly, the 120 volt input line 105 to the control board 100 is controlled (on/off) by the relay 106. Moreover, the on/off function of the relay 106 is controlled by a 24 volt on/off circuit that includes a pull switch, i.e., remote control switch 98 at the remote location, i.e., at the spray gun 92. Thus, the 120 VAC input line 105 supplies electricity to the transformer 108 as well as to the control board 100 through the relay 106.

It should be understood that all electric cords and plugs are common electrical parts that are well known throughout the industry. Indeed, all the electrical components employed in this spray system 20 are easily obtained and do not need modification to perform in accordance with the preferred embodiment. Further, the electrical connections and wiring between the electrical components is straight forward and is best illustrated in FIG. 11.

Returning again to FIGS. 2 and 10, a control box 96 is illustrated. The control box 96 comprises an enclosure 111 and a cover 112. The control box 96 is so provided in two pieces to allow the user easy access to the electrical components which are secured therein. The cover 112 is attached to the enclosure 111 by a plurality of sheet metal screws 114. For support of the control box 96, a mounting bracket 25 is supported from the frame 22. To provide the strongest connection to the frame 22, the mounting bracket 25 is welded thereto. As best seen in FIG. 2 the mounting bracket 25 provides support for the motor 24 as well as the control box 96. In the preferred embodiment, the mounting bracket 25 is constructed from a single piece of metal that is bent to form a horizontal surface 118 to which the control box 96 is attached.

Likewise, a portion of the mounting bracket 25 forms a vertical surface 120 to which the motor 24 is attached. In the preferred embodiment, the vertical surface 120 so noted above is supplied with a plurality of slotted holes 124. The slotted holes 124 provide points of attachment to receive therethrough bolts 126 that extend from the motor mounting plate (not illustrated).

It should be noted that frame 22, from which the mounting bracket 25 is supported, is a common type frame that includes wheels 131, and a frame axle 132. Typically, frames of this type are used in the construction of portable equipment such as pressure washers, paint sprayers and the like. Many different styles of frames presently available on the market could be employed, with slight modification, to produce equally satisfactory results. In addition, the frame 22 illustrated in FIGS. 1 and 2 comprise an adjustable handle 122 that is slidingly adjustable and locks into the desired position when a locking mechanism 123 is engaged.

Attention is now directed to FIGS. 1 through 3 for a more detailed description of the motor 24 and gear reducer 30 connection to the frame 22. It should be noted that for mounting purposes, the motor 24 and gear reducer 30 are connected via an industry standard C-Face type interface, i.e., the motor 24 is bolted and keyed into the gear reducer 30. In this way, the motor 24 and the gear reducer 30 act as a single unit for mounting purposes. In the preferred embodiment, the gear reducer 30 includes a pair of side mounting plates 128: the side mounting plates 128 are bolted with bolts 129 to opposite sides of the gear reducer 30. As illustrated, the side mounting plates 128 include an open vertical slot 130 formed therein. The width of slot 130 is sufficient to enable the same to be mounted to the frame axle 132 as best viewed in FIG. 1.

With this configuration, the frame axle 132 serves as a pivot point for the motor 24/gear reducer 30 combination. In the assembly process, the motor 24/gear reducer 30 unit is pivoted upward so that the motor 24 abuts the mounting bracket 25. Then, with the motor 24 disposed adjacent the mounting bracket 25, the motor 24 is bolted thereto.

In operation, the equipment is often used in wet environments where over-spray can reach the motor. Accordingly the motor 24 is equipped with a splash guard 134 to prevent material from entering the motor unit.

In addition, as cited above and illustrated in FIG. 10, liquid drywall material is supplied to a spray gun 92 through a hose 21 which is attached to the stator 46. Along with the hose 21, the wires are furnished for the 24 volt line 109. In addition, an air supply (not illustrated) is provided through air hose 93 to the gun so that compressed air can be used to disperse the drywall material.

Finally, it should be understood that the present invention is also directed to a method of making a spray system 20. Briefly, the method for making a compact, portable, electrically powered, knockdown spray system 20 for spraying liquid material on to surfaces comprises the steps of providing a frame 22 and thereon supporting an electrically activated motor 24 from the frame; the motor 24 having a motor drive shaft 26 disposed about a motor drive shaft axis 28.

A gear reducer 30 is employed having a driven end 32 and a drive end 34, the driven end 32 being configured to receive and engage the motor drive shaft 26, and the drive end 34 having a gear reducer drive shaft 36 that rotates responsive to electrical activation of the motor 24.

A pump 38 is coupled directly to the drive end 34 of the gear reducer 30: the pump 38 comprising a pump housing 40 that defines a containment chamber 42 for containing liquid material therein, and an inlet port 44 for receiving and directing liquid material into the containment chamber 42. A stator 46 is mounted to the pump housing 40, the stator 46 being in communication with the containment chamber 42. A rotor 48 is installed within the stator 46 for rotation about a pump rotation axis 50, the rotor 48 being drivingly connected to the gear reducer drive shaft 36, wherein the rotor 48 rotates responsive to rotation of the gear reducer drive shaft 36. In the preferred embodiment, the pump rotation axis is transverse to the motor drive shaft axis to reduce the size of the system.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. A compact, portable, electrically powered, knockdown spray system for spraying liquid material on to surfaces, the spray system comprising:

a frame;

an electrically activated motor supported by the frame, the motor having a motor drive shaft disposed about a motor drive shaft axis;

a gear reducer having a driven end and a drive end, the driven end being configured to receive and engage the motor drive shaft, the drive end having a gear reducer drive shaft that rotates responsive to electrical activation of the motor;

a pump comprising a pump housing, the pump housing being directly coupled to the drive end of the gear reducer, the pump housing defining a containment chamber to contain liquid material therein, and an inlet port for receiving and directing liquid material into the containment chamber, wherein the gear reducer drive shaft extends into the containment chamber;

a stator mounted to the pump housing, the stator being in communication with the containment chamber;

a rotor disposed within the stator for rotation about a pump rotation axis, the rotor being drivingly connected to the gear reducer drive shaft, wherein the rotor rotates responsive to rotation of the gear reducer drive shaft; and a mechanical seal disposed within the pump containment chamber about the gear reducer drive shaft, between the rotor and the gear reducer, for sealing the gear reducer from the liquid material.

2. A spray application machine as recited in claim 1 wherein the pump rotation axis is disposed transverse to the motor drive shaft axis.

3. A spray application machine as recited in claim 2 further comprising a hopper disposed above the pump housing, wherein the inlet port extends upwardly from said pump housing to releasably engage said hopper such that the hopper is in communication with the containment chamber.

4. A spray application machine as recited in claim 1 wherein the gear reducer is a right angle gear reducer.

5. A spray application machine as recited in claim 1 further comprising a hopper disposed above the pump housing, wherein the inlet port extends upwardly from said pump housing to releasably engage said hopper such that the hopper is in communication with the containment chamber.

6. A spray application machine as recited in claim 5 further comprising a male cam-loc fitting mounted to the hopper, and a female cam-loc fitting mounted to the inlet port for receiving and releasably locking the male cam-loc thereto, thereby preventing relative movement and separation between the hopper and the pump housing.

7. A spray application machine as recited in claim 5 wherein the gear reducer is a right angle gear reducer.

8. A compact, portable, electrically powered, knockdown spray system for spraying liquid material on to surfaces, the spray system comprising:

a frame;

an electrically activated motor supported by the frame, the motor having a motor drive shaft disposed about a motor drive axis;

a gear reducer having a driven end and a drive end, the driven end being configured to receive and engage the motor drive shaft, the drive end having a gear reducer drive shaft that rotates responsive to electrical activation of the motor;

a pump comprising a pump housing, the pump housing being directly coupled to the drive end of the gear reducer, the pump housing defining a containment chamber to contain liquid material therein, and an inlet port for receiving and directing liquid material into the containment chamber;

a stator mounted to the pump housing, the stator being in communication with the containment chamber;

a rotor disposed within the stator for rotation about a pump rotation axis, the rotor being drivingly connected to the gear reducer drive shaft, wherein the rotor rotates responsive to rotation of the gear reducer drive shaft;

a cam-loc fitting mounted to the inlet port for receiving and releasably locking thereto a source of liquid material; and a control system for variable control of the motor speed.

9. A method for making a compact, portable, electrically powered, knockdown spray system for spraying liquid material on to surfaces, the spray system comprising the steps:

providing a frame;

supporting an electrically activated motor from the frame, the motor having a motor drive shaft disposed about a motor drive shaft axis;

providing a gear reducer having a driven end and a drive end, the driven end being configured to receive and engage the motor drive shaft, the drive end having a gear reducer drive shaft that rotates responsive to electrical activation of the motor;

coupling a pump directly to the drive end of the gear reducer, the pump comprising a pump housing that defines a containment chamber for containing liquid material therein, and an inlet port for receiving and directing liquid material into the containment chamber wherein the gear reducer drive shaft extends into the containment chamber;

mounting a stator to the pump housing, the stator being in communication with the containment chamber;

installing a rotor within the stator for rotation about a pump rotation axis, the rotor being drivingly connected to the gear reducer drive shaft, wherein the rotor rotates responsive to rotation of the gear reducer drive shaft, and providing a mechanical seal, the mechanical seal being disposed within the pump containment chamber about the gear reducer drive shaft, between the rotor and the gear reducer, for sealing the gear reducer from the liquid material.

10. A method for making a spray system as recited in claim 9 wherein the pump rotation axis is transverse to the motor drive shaft axis.

11. A compact, portable, electrically powered, knockdown spray system for spraying liquid material on to surfaces, the spray system comprising:

a frame;

an electrically activated motor supported by the frame, the motor having a motor drive shaft disposed about a motor drive shaft axis;

a gear reducer having a driven end and a drive end, the driven end being configured to receive and engage the motor drive shaft, the drive end having a gear reducer drive shaft that rotates responsive to electrical activation of the motor;

a pump comprising a pump housing, the pump housing being directly coupled to the drive end of the gear reducer, the pump housing defining a containment chamber to contain liquid material therein, and an inlet port for receiving and directing liquid material into the containment chamber;

a stator mounted to the pump housing, the stator being in communication with the containment chamber;

a rotor disposed within the stator for rotation about a pump rotation axis, the rotor being drivingly connected to the gear reducer drive shaft, wherein the rotor rotates responsive to rotation of the gear reducer drive shaft; and a remote control switch for remote operation of the motor.

12. A compact, portable, electrically powered, knock-down spray system for spraying liquid material on to surfaces, the spray system comprising:

a frame;

an electrically activated motor supported by the frame, the motor having a motor drive shaft disposed about a motor drive shaft axis;

a gear reducer having a driven end and a drive end, the driven end being configured to receive and engage the motor drive shaft, the drive end having a gear reducer drive shaft that rotates responsive to electrical activation of the motor;

a pump comprising a pump housing, the pump housing being directly coupled to the drive end of the gear reducer, the pump housing defining a containment chamber to contain liquid material therein, and an inlet port for receiving and directing liquid material into the containment chamber;

a stator mounted to the pump housing, the stator being in communication with the containment chamber;

a rotor disposed within the stator for rotation about a pump rotation axis, the rotor being drivingly connected to the gear reducer drive shaft, wherein the rotor rotates responsive to rotation of the gear reducer drive shaft; and a control system for variable control of the motor speed.

13. A compact, portable, electrically powered, knock-down spray system for spraying liquid material on to surfaces, the spray system comprising:

a frame;

an electrically activated motor supported by the frame, the motor having a motor drive shaft disposed about a motor drive shaft axis;

a gear reducer having a driven end and a drive end, the driven end being configured to receive and engage the motor drive shaft, the drive end having a gear reducer drive shaft that rotates responsive to electrical activation of the motor;

a pump comprising a pump housing, the pump housing being directly coupled to the drive end of the gear reducer, the pump housing defining a containment chamber to contain liquid material therein, and an inlet port for receiving and directing liquid material into the containment chamber;

a stator mounted to the pump housing, the stator being in communication with the containment chamber;

a rotor disposed within the stator for rotation about a pump rotation axis, the rotor being drivingly connected to the gear reducer drive shaft, wherein the rotor rotates responsive to rotation of the gear reducer drive shaft;

a cam-loc fitting mounted to the inlet port for receiving and releasably locking thereto a source of liquid material; and a remote control switch for remote operation of the motor.

14. A compact, portable, electrically powered, knock-down spray system for spraying liquid material on to surfaces, the spray system comprising:

a frame;

an electrically activated motor supported by the frame, the motor having a motor drive shaft disposed about a motor drive shaft axis;

a gear reducer having a driven end and a drive end, the driven end being configured to receive and engage the motor drive shaft, the drive end having a gear reducer drive shaft that rotates responsive to electrical activation of the motor;

a pump comprising a pump housing, the pump housing being directly coupled to the drive end of the gear reducer, the pump housing defining a containment chamber to contain liquid material therein, and an inlet port for receiving and directing liquid material into the containment chamber;

a stator mounted to the pump housing, the stator being in communication with the containment chamber;

a rotor disposed within the stator for rotation about a pump rotation axis, the rotor being drivingly connected to the gear reducer drive shaft, wherein the rotor rotates responsive to rotation of the gear reducer drive shaft;

a cam-loc fitting mounted to the inlet port for receiving and releasably locking thereto a hopper having a mating cam-loc fitting for connecting and supporting the hopper from the inlet port such that the hopper is in communication with the containment chamber to provide a source of liquid material.

15. A spray application machine as recited in claim 14 wherein the gear reducer is a right angle gear reducer.

16. A spray application machine as recited in claim 14 wherein the gear reducer drive shaft extends into the containment chamber.

* * * * *